US005924075A

United States Patent [19]
Kanemitsu

[11] Patent Number: 5,924,075
[45] Date of Patent: Jul. 13, 1999

[54] ITINERARY PREPARING SYSTEM

[75] Inventor: Hiroyuki Kanemitsu, Susono, Japan

[73] Assignee: Toyota Jidosha Kabushiki Kaisha, Toyota, Japan

[21] Appl. No.: 08/786,042

[22] Filed: Jan. 21, 1997

[30] Foreign Application Priority Data

Jan. 24, 1996 [JP] Japan .................................. 8-010091

[51] Int. Cl.⁶ .................................................. G06F 15/50
[52] U.S. Cl. .................................. 705/6; 705/5; 701/201; 701/209; 701/202; 701/200
[58] Field of Search ........................... 705/6, 5; 701/201, 701/200, 202, 209

[56] References Cited

FOREIGN PATENT DOCUMENTS

| 0 638 887 | 2/1995 | European Pat. Off. . |
|---|---|---|
| 660289 | 6/1995 | European Pat. Off. . |
| 0 669 586 | 8/1995 | European Pat. Off. . |
| 4-213761 | 8/1992 | Japan . |
| 5-313583 | 11/1993 | Japan . |
| 7-55484 | 3/1995 | Japan . |

OTHER PUBLICATIONS

Abstract, System for providing recommended routes in sightseeing spots by using fuzzy theory, Masami Kato et al, Information Processing Society of Japan, pp. 1572–1573.
Abstract, Basic Examination on System for Planning tourism Program, Masami Kato et al, Information Processing society of Japan.
A Travel Consultation System: towards a smooth conversation in Japan, H. Suzuki et al, Abstract, pp. 227–235.
Patent Abstracts of Japan, vol. 96, No. 001, May 31, 1996 re JP 08 005391.
Patent Absstracts of Japan, vol. 012, No. 300 (P–745) Aug. 16, 1988 re JP 63 073371.
Patent Abstract of Japan, vol. 96, No. 7 Jul. 1993 re JP–A 08 075493.
Abe, K. et al, "Planning Method Combining Rule–Bases and Optimization . . . ", Robitics, CIM and Automation, Emerging Technology, IEEE, vol. 2 Nov. 1992, pp. 902–906.
Zoltners A.A. et al, "An Optimal Algorithm for Sales Representative Time Management", Management Science, vol. 25 No. 12, Dec. 1979, pp. 1197–1207.
"Entertainment Guide Enabling", IBM Technical Disclosure Bulletin, vol. 37 No. 4a, Apr. 1994 p. 567.
Anagnostopoulos P et al, "Pan–Drive: A Vehicle Navigation and Rout Guidance System", Proceedings of the Vehicle Navigation and Information Systems Conference, Sep. 2–4, 1992 pp. 14–19.

*Primary Examiner*—Allen R. MacDonald
*Assistant Examiner*—Jagdish Patel
*Attorney, Agent, or Firm*—Pillsbury Madison & Sutro LLP

[57] ABSTRACT

A system which is capable of planning a tour time schedule using simple facility information entered by a traveler and then easily and quickly preparing a complete itinerary for implementing a comfortable tour. When the traveler inputs desired facilities (destinations), departure date and time, a departure location and a return destination, a schedule preparation section calculates the basic route by searching data bases and also searches basic stay time previously set with regard to the entered facilities from basic stay time storage section, thereby preparing an itinerary. If the items entered by the traveler do not contain supplementary items for smoothly implementing the tour, the supplementary items stored in the supplementary item storage section are incorporated to prepare a time schedule which takes the basic stay time of the supplementary items into consideration.

12 Claims, 6 Drawing Sheets

Fig. 1

| FACILITY | BASIC STAY TIME |
|---|---|
| AMUSEMENT PARK | 6 h |
| TENNIS COURT | 3 h |
| DEPARTMENT STORE | 2 h |
| ART MUSEUM | 3 h |
| BREAKFAST(SHOP) | 0.5 h |
| LUNCH (SHOP) | 1 h |
| DINNER (SHOP) | 2 h |
| REST PLACE | 1 h |
| REST PLACE IN S.S, OR P.A. | 0.5 h |

Fig. 2

| SUPPLEMENTARY ITEM | CLASSIFICATION | APPLICATION TIMING | BASIC STAY TIME |
|---|---|---|---|
| REST | ORDINARY ROAD | 100 MINUTES | 20 MINUTES |
| | EXPRESSWAY | 60 MINUTES | 15 MINUTES |
| MEAL | BREAKFAST | 8:00 | 30 MINUTES |
| | LUNCH | 12:30 | 60 MINUTES |
| | DINNER | 19:30 | 120 MINUTES |
| LODGE | — | 23:00 | UNTIL 10:00 THE FOLLOWING MORNING |

| ITINERARY | | |
|---|---|---|
| TIME | CONTENT | PLACE |
| 9:00 | DEPARTURE | MISHIMA STATION |
| ⋮ | MOVE | ROUTE ** |
| 10:40 | | |
| ⋮ | REST | RESTAURANT ** |
| 11:00 | | |
| ⋮ | MOVE | ROUTE ** |
| 12:30 | | |
| ⋮ | LUNCH | UENO CAFE ** |
| 13:30 | | |
| ⋮ | ART MUSEUM | UENO |
| 16:30 | | |
| ⋮ | MOVE | ROUTE ** |
| 17:30 | | |
| ⋮ | SHOPPING | YOKOHAMA XX DEPARTMENT STORE |
| 19:30 | | |
| ⋮ | DINNER | YOKOHAMA RESTAURANT ** |
| 21:30 | | |
| ⋮ | MOVE | ROUTE ** |
| 23:00 | | MISHIMA STATION |

ITINERARY PREPARING SYSTEM

BACKGROUND OF THE INVENTION

1. Field of the Invention

This invention relates to an itinerary preparing system, and more specifically to a system for preparing a detailed itinerary based on simple information entered by a traveller.

2. Description of Related Art

Recently, navigation systems have been widely used. These navigation systems are capable of indicating a recommended travelling route between a present position and a final destination using stored map information. Similarly, communication systems have been proposed in which an optimum traveling route can be obtained while taking necessary information such as road traffic information obtained by accessing a database from a vehicle-mounted terminal or a portable terminal and the like, into consideration. Other communication systems for receiving, e.g., guide information for amusement facilities and restaurants have been also proposed.

For example, Japanese Patent Laid-Open Publication Hei 5-313583 discloses a navigation system for providing the shortest and most efficient route for travelling a plurality of destinations entered by a traveller (a parcel delivery person) using their addresses.

Also, an itinerary preparing system which uses these navigation systems for planning an itinerary including desired destinations has been proposed. According to such a system, it is possible to calculate the time required to reach each of the destinations through a recommended route, from the travel distance and the traffic history of the route, so as to reflect the time schedule into the itinerary, thereby preparing an itinerary which fits the actual situations.

In the above-mentioned itinerary preparing system, however, it is necessary for a traveler to individually input a duration of stay (hereinafter merely referred to as "stay time") for each destination, when planning an itinerary including a time schedule. This increases the number of input items which must be entered by the traveler, which makes the input process more laborious.

On the other hand, in order to make a trip comfortable and not overly tiring, it is necessary to take meals and rests or, in some cases, to lodge, at appropriate intervals. However, when planning an itinerary, a traveler's interest is usually centered on destinations he/she wishes to visit. Therefore, the traveler mainly inputs information on these desired destinations, and does not input or fails to input detailed meal and rest information, unless his/her tour object is to take meals or rests. As a result, the following inconvenience would arise when actually implementing the prepared tour: because of the unexpected time taken for meals and/or rests, the traveler may not be able to reach the destination by the originally scheduled time, or the traveler may feel uncomfortable. This leads to a problem that the scheduled tour cannot be implemented smoothly.

SUMMARY OF THE INVENTION

The present invention is intended to overcome the foregoing problems, object of the present invention is to provide an itinerary preparing system which is capable of planning a time schedule from simple information on desired destinations so as to easily and quickly prepare an itinerary for implementing a smooth trip.

To this end, in accordance with one embodiment of the present invention, there is provided an itinerary preparing system for preparing an itinerary based on information regarding at least one facility entered by a traveler, the system comprising: basic stay time storage means for previously storing basic stay time for each of said facilities; search means for searching through the basic stay time storage means for the basic stay time corresponding to said facilities; and schedule preparation means for preparing an itinerary based on the searched basic stay time.

In this specification, the "facilities" mean destinations for a trip as well as intermediate locations the traveler visits before reaching the destinations, and include sightseeing spots or the like having no buildings, as well as actual buildings. The "basic stay time" for each facility means an optimal time period for utilizing the facility, such as 1 hour for a restaurant for having lunch, and 6 hours for an amusement park. This basic stay time may be automatically set by the system as a recommended time according to past data based on the traveler's activity patterns, or may be freely set or changed by the traveler himself/herself.

According to this system, if the traveler simply enters the positions (addresses) and names of the desired facilities, optimal stay time for these facilities is obtained. Thus, it is possible from a simplified input operation to plan a tour time schedule fitting the actual situation, thereby easily preparing a whole itinerary.

In accordance with another embodiment, there is provided an itinerary preparing system for preparing an itinerary based on information regarding at least one facility entered by a traveler, the system comprising: supplementary item storage means for storing supplementary items for smoothly implementing a tour; item judgement means for determining whether or not said supplementary items are contained in items entered by the traveler; and schedule supplement means for inserting said supplementary items into predetermined time points in the itinerary on the basis of the result from the judge means to supplement the itinerary.

The "supplementary items" are items recommended to be incorporated into the itinerary so that the traveler can securely reach the entered facilities with less fatigue and smoothly implement the tour. The "predetermined time points" into which the supplementary items are inserted are optimum time points for implementing the content of the supplemental items, when taking time, traveling route, elapsed traveling time, etc. into consideration. For example, a time point after traveling an expressway for an hour, or a time point just past noon is considered to be appropriate for implementing the contents (rest or meal) of the supplementary items.

According to this system, if the items entered by the traveler do not contain the supplementary items that are desirably incorporated into the itinerary in order to smoothly visit the entered facilities, these supplementary items are inserted into appropriate time points so as to complete the itinerary. As a result, it is possible to plan an ideal itinerary which more closely matches an actual situation.

In a further embodiment, said supplementary items are rest facilities.

Here, the "rest facilities" are facilities which temporarily interrupt traveling, such as lodging facilities including hotels, as well as road-side shops, coffee shops, restaurants, or scenic viewpoints with available parking, such as a hill with a beautiful view.

With such a structure, it is possible to appropriately incorporate a rest time which the traveler tends to miss at the time he/she inputs information, thereby preparing a more comfortable itinerary with less fatigue.

In another embodiment, the supplementary item storage means stores the rest facilities and basic stay time at these facilities, and the schedule supplement means inserts the rest facilities into predetermined time points in the itinerary when the supplemental items are not contained in the entered items based on the result from the item judgement means and plans a time schedule based on the basic stay time of these rest facilities so as to supplement the itinerary.

According to such a system, it is possible to prepare a detailed itinerary which better fits actual situations simply by entering basic information regarding desired facilities.

In another embodiment, there is provided an itinerary preparing system further comprising: basic stay time storage means for previously storing basic stay time for each of the facilities; search means for searching through the basic stay time storage means for the basic stay time corresponding to the facilities; and schedule preparation means for preparing an itinerary based on the searched basic stay time of the entered facilities and the basic stay time of the inserted supplemental facilities.

According to such a system, it is possible to prepare an ideal itinerary which better fits actual situations simply by entering information regarding the intended facilities.

Further, in another embodiment of the present invention, the system further includes change means for changing the basic stay time and the supplementary items.

According to such a system, it is possible to rapidly provide basic stay time and supplemental items that fit the traveler's activity patterns.

Still further, in another embodiment of the present invention, the system further includes an output section for outputting the prepared itinerary. The output section can be, for example, a display or a printer.

According to such a system, it is easy to verify the prepared itinerary, which further makes it easier for the traveler to review the prepared schedule.

Further, to achieve the above object, in accordance with another embodiment, there is provided a program storage device readable by a machine, tangibly embodying a program of instructions executable by the machine to perform method steps for making an itinerary, said method steps comprising steps of:

1) receiving information regarding facilities;

2) searching through a database which stores a basic stay time corresponding to each of the facilities for the basic stay time corresponding to each the facilities; and 3) preparing an itinerary based on the searched basic stay time.

Still further, to achieve the above object, in accordance with another embodiment, there is provided a program storage device readable by a machine, tangibly embodying a program of instructions executable by the machine to perform method steps for making an itinerary, said method steps comprising steps of:

1) receiving information regarding facilities;

2) determining whether or not the received facility information contains supplementary items for smoothly implementing a tour; and 3) when the supplementary items are not contained in the received information as a result from the determining step, inserting the supplementary items into predetermined time points in the itinerary so as to complete the itinerary.

The program storage device includes, for example, a magnetic disc, magnetic tape, RAM, flash memory, optical disc, DVD, etc., as well as a CD-ROM and a floppy disc. The storage device also includes a RAM which stores the program received from an outside service center via a communication line and is used to perform an itinerary preparing operation.

According to the above configuration, the program stored in the storage device can be executed by a personal computer or the like. Thus, it is possible to easily prepare an itinerary which can be smoothly implemented, by using existing hardware.

BRIEF DESCRIPTION OF THE DRAWINGS

The present invention will become more apparent from the following detailed description of a presently preferred embodiment when taken in conjunction with the accompanying drawings.

DESCRIPTION OF THE PREFERRED EMBODIMENT

Figure 1:
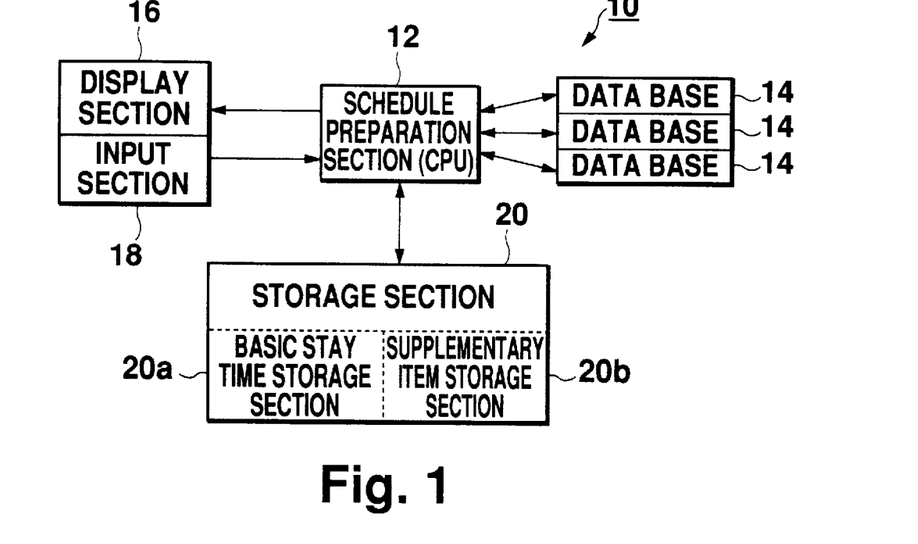
FIG. 1 is a schematic system block diagram of an itinerary preparing system in accordance with one embodiment of the present invention.

Referring to FIG. 1, an itinerary preparing system 10 includes a schedule preparation section (CPU) 12 which contains therein a route operation section, data search section, learning function section, etc (not shown). The itinerary preparing system 10 may be composed of a portable personal computer, a desktop computer, or a vehicle-mounted terminal. External or internal data bases 14 are connected to the data search section of the schedule preparation section 12 by direct or wireless means. The external data base includes an information center which provides a large amount of facility information and a traffic information center. The system 10 is thus capable of obtaining desired information such as map information, facility guide, traffic information, or the like from the internal or external data bases.

The schedule preparation section 12 is also connected to a display section 16 which indicates a prepared schedule or the development of the operation procedure, and to an input section 18 which is either integrally formed with or separately provided of the display section 16. If the input section 18 is integrally formed with the display section 16, it may be a touch switch provided on the display section 16, whereas if the input section 18 is separate, it may be a keyboard, mouse, or other device.

The schedule preparation section 12 is further connected to a storage section 20 for storing specific data regarding the itinerary preparation. The storage section 20 includes a basic stay time storage section 20a which stores the basic stay time for each facility, supplementary item storage section 20b which stores supplementary items for completing the itinerary, which will be described later, and also a section which stores data on itineraries which were made in the past. Here, the basic stay time storage section 20a and the supplementary item storage section 20b constitute, together with the schedule preparation section 12 and the input section 18, change means which is capable of changing the content of memory as desired. This structure enables the system to provide basic time and supplementary items that fit the traveler's activity patterns.

The itinerary preparing system 10 previously (i.e., in advance) stores the basic stay time for certain facilities based on the traveler's activity patterns. At the time of schedule preparation, the system 10 plans a time schedule while considering the basic stay time and rapidly prepares a whole itinerary.

Further, the itinerary preparing system 10 previously stores supplementary items for supplementing the itinerary such that the traveler can smoothly visit the desired facilities. At the time of schedule preparation, the system 10 considers and appropriately incorporates the supplementary items to rapidly prepare a full itinerary.

Figure 2:
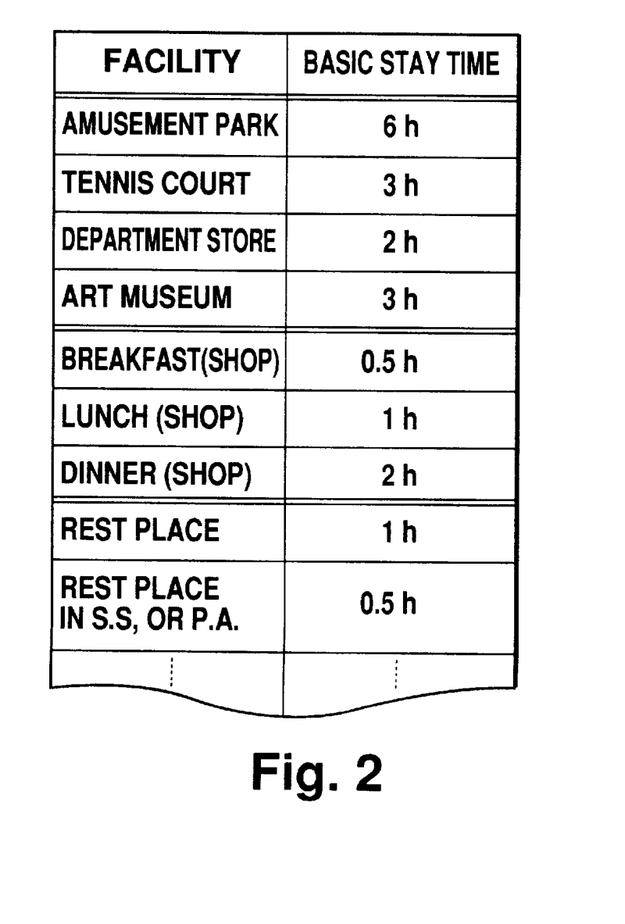
FIG. 2 shows examples of basic stay time for each facility used in the system of the present invention.

The procedure for preparing an itinerary will be described with reference to display examples of FIGS. 2 and 3, and a operation flowchart of FIG. 4.

First of all, a traveler previously registers basic stay time of any desired facilities in the basic stay time storage section 20a of the storage section 20 as a preparation for making itinerary. As shown in FIG. 2, the basic stay time is set for each facilities. For example, if the facility is an amusement park, a sufficient time for enjoying the facilities (e.g., 6 hours) is set, while a sufficient time for shopping (e.g., 2 hours) is set for a department store. Likewise, for shops serving breakfast and dinner, e.g., 0.5 and 2 hours is set, respectively. Further, for taking a rest in a coffee shop or the like, 1 hour is set, while for taking a rest at a service station (S.S.) or a parking area (P.A.), for example 0.5 hours is set. The basic stay time stored in the basic stay time storage section 20a and the facilities having the basic time may be automatically set by the leaning function section of the schedule preparation section 12 with reference to the traveler's activity patterns in the past (such as stay time for similar facilities in the past itinerary) or may be freely set or modified by the traveler through the input section 18. Although the basic stay time is set for each of relatively roughly classified facilities in FIG. 2, it may be set for more specific facilities, such as 7 hours for the XY amusement park, 4.5 hours for the YZ department store, and so on. In this specification, the facility means a tour destination and also an intermediate place the traveler visits before reaching the destination, or the like, and includes sightseeing spots or the like having no buildings, as well as actual buildings.

The traveler also registers previously, in the supplementary item storage section 20b, supplementary items for supplementing the itinerary so as to smoothly visit the desired facilities. The supplementary items are items which are recommended to be incorporated into the itinerary so that the traveler can securely reach the entered facilities with less fatigue and can smoothly implement the prepared tour. Actually, as shown in FIG. 3, the supplementary items are, for example, rest, meal, and lodge, and application timings at which these supplementary items should be considered are also set. For example, it is recommended to take a rest after 100 minutes driving along an ordinary road, and to take a rest after 60 minutes driving along an expressway. Likewise, it is recommended to have breakfast when it is past 8:00 am. Further, if the itinerary is implemented after 23:00, it is recommended to lodge at a hotel or the like.

Figure 3:
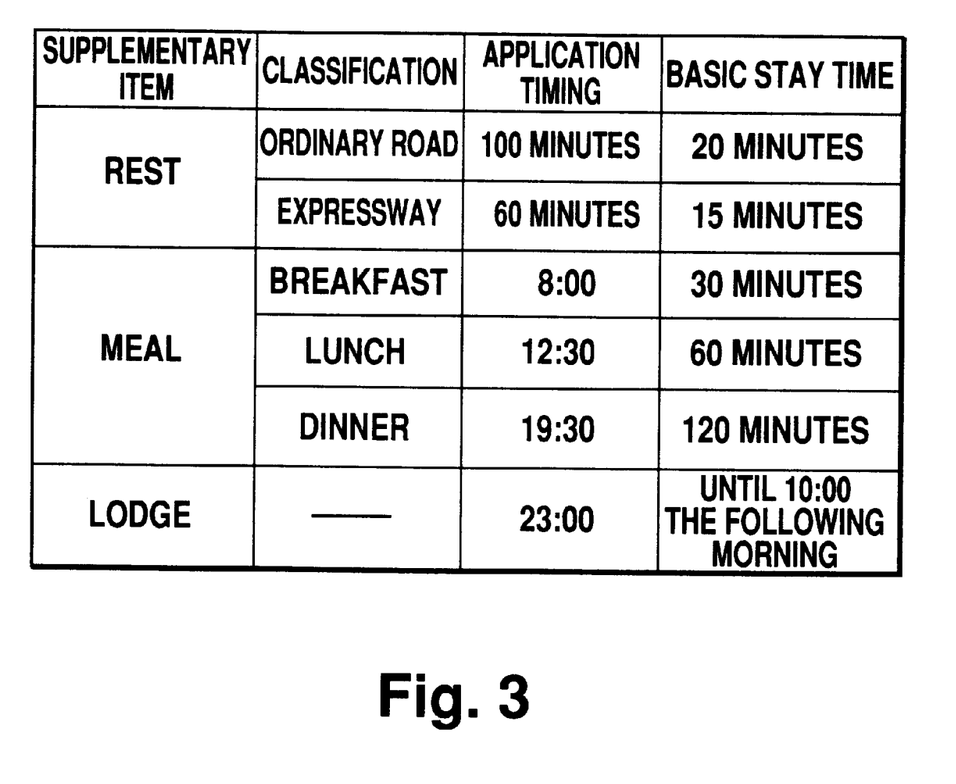
FIG. 3 shows examples of application timing and basic stay time for each of supplementary items.

As shown in FIG. 3, the basic stay time is set for each of the supplementary items.

Figure 4:
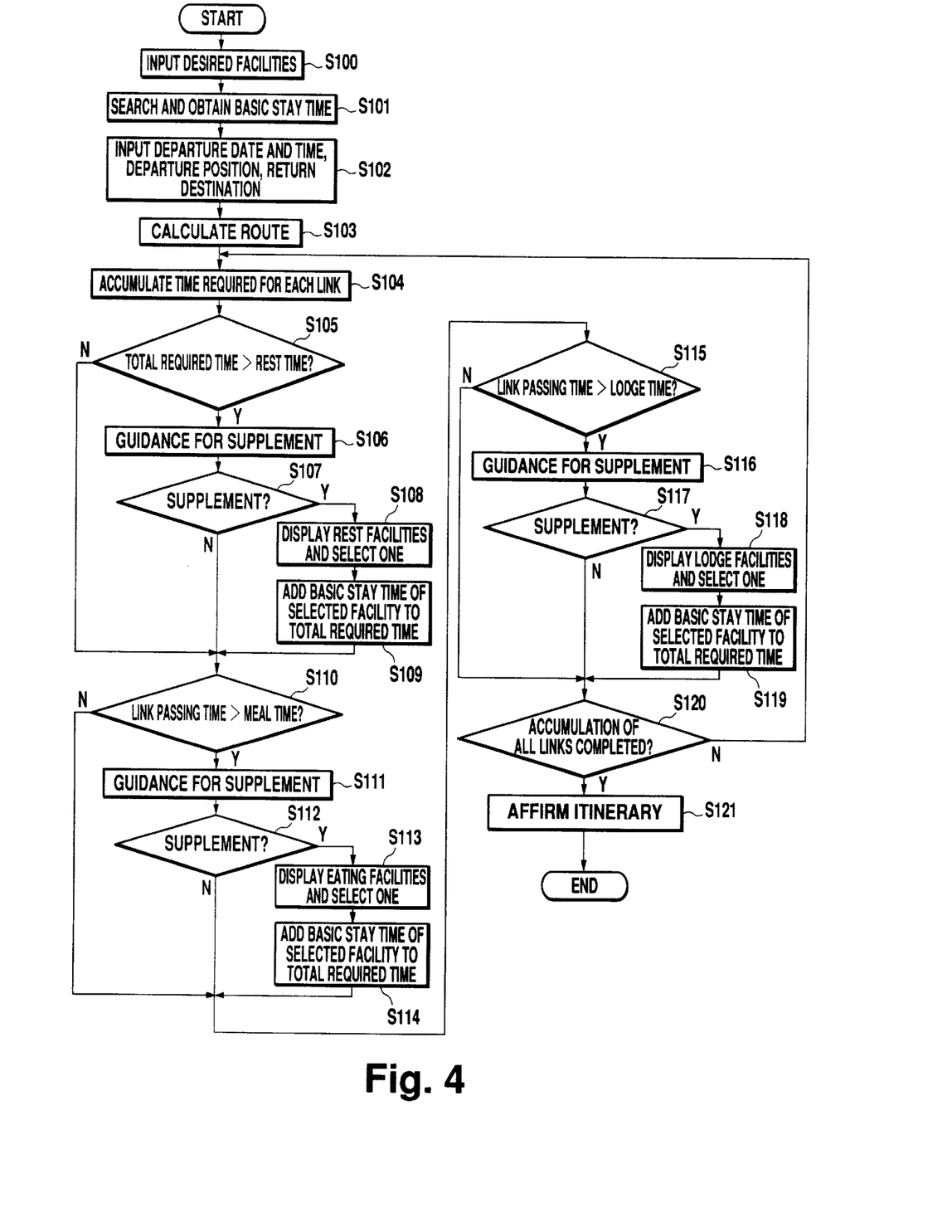
FIG. 4 is a flowchart for explaining procedure for preparing the itinerary in the system of the present invention.

Referring to FIG. 4, in order to start making an itinerary, the traveler inputs a desired facility (destination) (step S100). The facility may be input by searching a facility list or destination list provided from the data base 14 connected to the schedule preparation section 12 and then designating the desired facility, or by retrieving map information from the data base 14 and indicating the facility on the map. Alternatively, the traveler may directly input the name or the address of the facility and search the data base 14. When more than one facilities are desired, the foregoing input operation is repeated. Then, the schedule preparation section 12 searches the basic stay time storage section 20a of the storage section 20 to obtain the basic stay time for the designated facility (step S101). For example, when an amusement park is designated, 6 hours is detected as the basic stay time. Similarly, 2 hours is detected as the basic stay time for a shop where the traveler can eat dinner.

Next, the departure time and date, a departure point, and a return destination are input (step S102). For example, data such as "Apr. 9, 1996, 8:00 am, departure from the Mishima station and return to the Mishima station" are input.

When the facility, departure date and locations are specified, the route operation section (not shown) of the schedule preparing section 12 calculates an actual travel route using map information obtained from the data base 14 (step S103). This travel route is composed of a plurality of links, each of which is obtained, for example, by dividing a road having a width of 5.5 m or more, or a Japanese national road, into sections for every intersection. Starting from the departure point, the schedule preparation section 12 calculates and sequentially accumulates the time required for travelling each link. In this manner, for every link, the schedule preparation section 12 calculates the total required time and also the link passing time obtained by adding the total required time to the departure time (step S104). At this time, the schedule preparing section 12 obtains information on the traffic jam patterns or the traffic regulation, etc. and concerning the objective links by accessing the data bases 14, so as to calculate the time required for the links and establish the time schedule.

Figure 5:
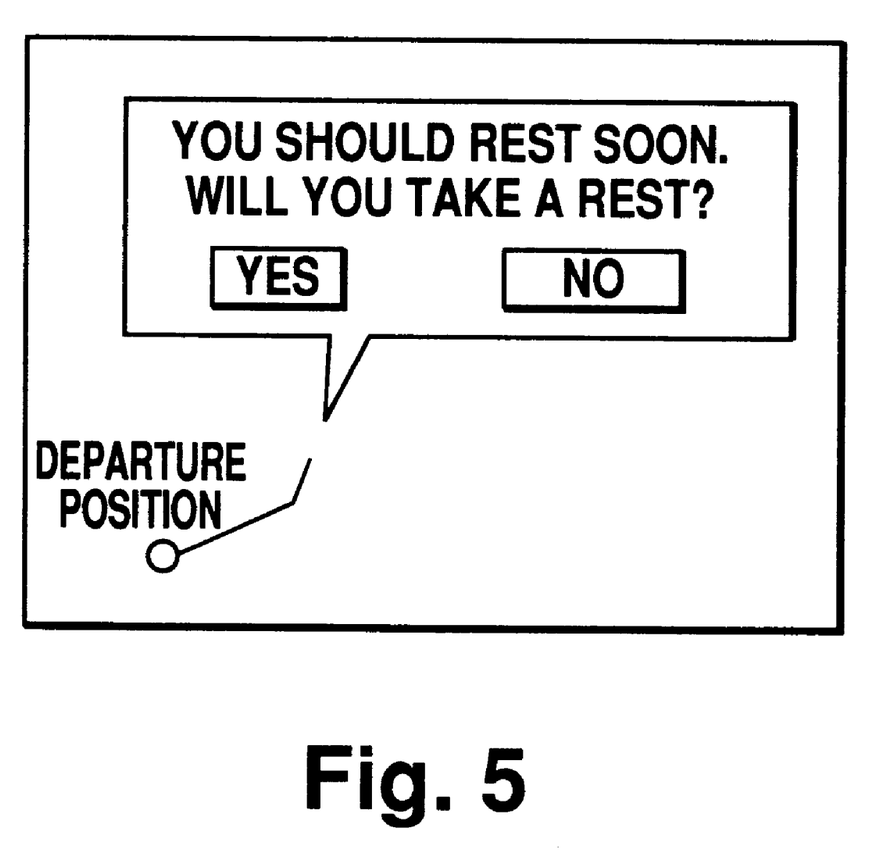
FIG. 5 shows an example of a displayed supplementary guide in the system of the present invention.

It is then determined whether or not the total required time has reached the application timing of the supplementary item. In this embodiment, it is firstly determined whether or not the rest time is reached, i.e., whether the total required time>the rest time (step S105). In order to make a smooth and comfortable trip, it is preferable to take rests at appropriate intervals. Therefore, if the total required time exceeds 100 minutes, which is an appropriate time for taking a rest, during travel on an ordinary road, a guidance to recommend a rest is performed (step S106). In this case, as shown in FIG. 5, at the position on the display section 16 where the total required time exceeds the application timing, a guidance indicating, for example, "You should rest soon. Will you take a rest? YES/NO" is displayed. Then, the traveler determines whether or not he/she needs a rest around there, that is, whether or not to perform the supplement (step S107).

If the traveler determines to perform the supplement, he/she selects "YES" through the input section 18. Then, the data search section of the schedule preparation section 12 searches the data bases 14 to make lists of rest facilities such as restaurants along the road, coffee shops with parking lots, etc., near the location of the application timing (preferably along the route), and indicates the lists on the display section 18. The traveler selects the desired facility among the lists (step S108). The schedule preparation section 12 then searches the basic stay time for the selected facility and adds the time to the total required time (step S109). At this time, if the selected facility is not located along the route, the time required to go to and return from the facility is also added to the time accumulation. The basic stay time may be roughly set for each of the supplementary items as shown in FIG. 3, or may be specifically set for individual facilities.

If the total required time does not exceed the application timing at step S105, if the supplement is completed (step S109), or the supplement is rejected at step S107, it is determined whether or not to take a meal, which is the next supplementary item, i.e. the link passing time>the meal time (step S110). Specifically, it is determined whether or not the link passing time has passed the predetermined absolute time. For having breakfast, for example, it is determined whether or not the link passing time has passed the predetermined absolute time 8:00. If it has, a supplementary guidance recommending having breakfast is performed (step S111). As in the case of taking a rest, this guidance is performed by indicating, for example, "You should have breakfast soon. Will you have breakfast? YES/NO". The traveler determines whether or not he/she desires to have breakfast, that is, whether or not to perform the supplement (step S112). If the traveler determines to perform the supplement, he/she selects "YES" through the input section 18. Then, the data search section searches the data bases 14 to make lists of rest facilities where the traveler can have breakfast, such as restaurants, coffee shops with parking lots, etc., near the location of the application timing, and indicates the lists on the display section 18. The traveler selects the desired facility among the lists (step S113). The schedule preparing section 12 then searches the basic stay time for the selected facility and adds the time to the total required time (step S114), as in the foregoing case. If the link passing time has not passed the application time at step S110, if the supplement is completed (step S114), or the supplement is rejected at step S112, it is determined whether or not it is a time for lodging, which is the next supplementary item, that is, the link passing time>the lodging time (step S115). Specifically, as in the case of taking a meal, it is determined whether or not the link passing time has passed the predetermined absolute time. For example, if the link passing time has passed 23:00, a supplementary guidance to recommend to lodge is performed (step S116). The procedures for determining whether or not to perform the supplement at steps S115 to S119 are similar to steps S110 to S114, and will not be described again. The basic stay time for lodging is, for example, until the checkout time of the facility in the following morning, and the itinerary in the following morning starts from this checkout time. Further, when lodging facilities such as a hotel are displayed at step S118, the reservation status and/or the charge may also be displayed.

If the link passing time has not passed the application time at step S115, if the supplement is completed (step S119), or the supplement is rejected at step S117, it is judged that review of the predetermined supplementary items with regard to currently accumulated links is completed, and it is further determined whether or not accumulation of all the links from the departure point to return destination is completed (step S120). If the accumulation is not completed, the process returns back to step S104 to add the next link, and the operation procedures from steps 105 to 120 are repeated.

Further, when the traveler rejects a supplement of rest, meal, lodge, or the like, he/she may input data indicating when he/she will need that rejected item next time, so that guidance regarding that rejected item will not be performed for a certain time. This makes it unnecessary for the traveler to determine at each link accumulation, whether to accept the item which has been rejected, thereby smoothly performing a supplement operation.

If accumulation of all the links is completed, the itinerary is affirmed (step S121), and the content of the schedule is displayed on the display section 16 or is outputted to a printer or the like (not shown).

Figure 6:
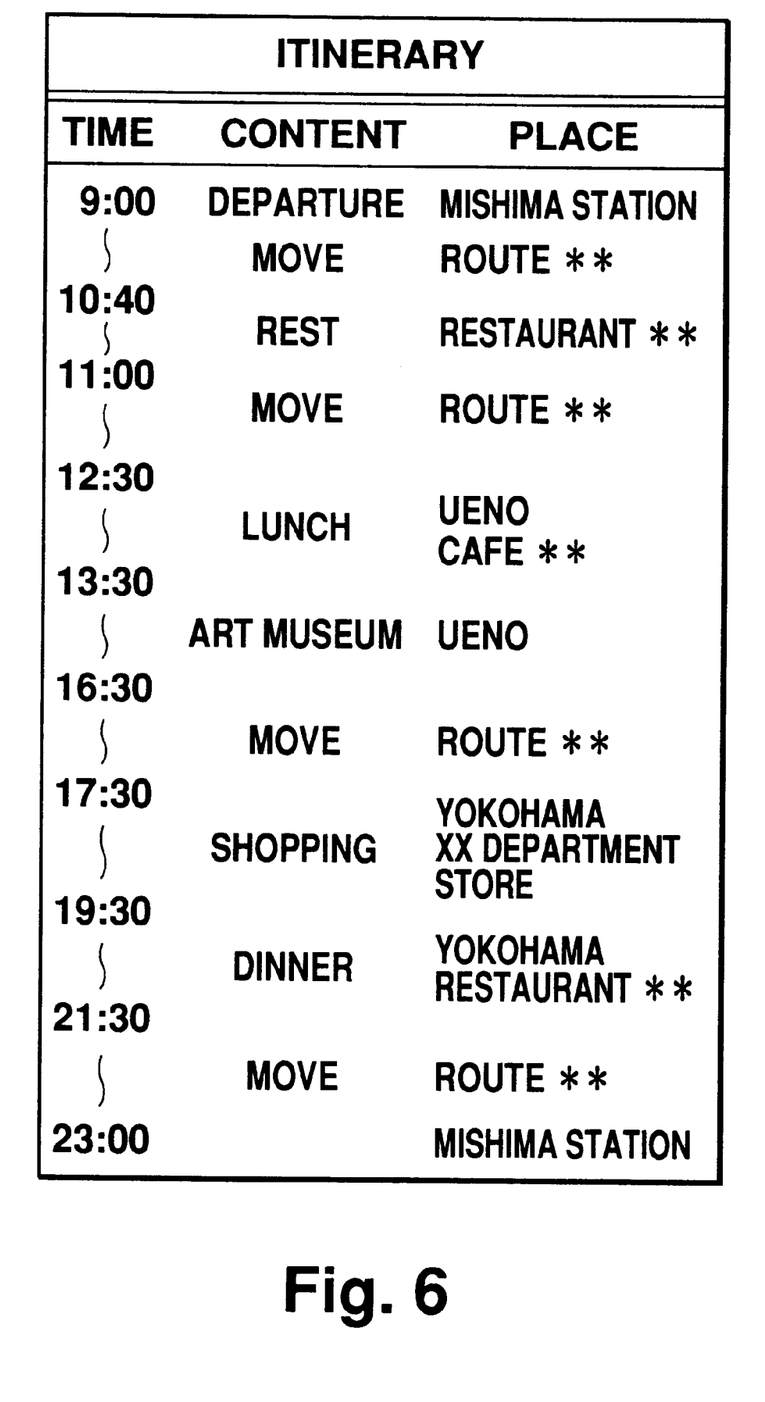
FIG. 6 shows an example of an itinerary prepared by the system of the present invention.

FIG. 6 shows an example of itinerary which incorporates the supplementary items, prepared in accordance with the present invention. In this case, the traveler inputs, as the desired facilities, data indicating art appreciation at an art museum in Ueno and shopping in a department store in Yokohama at step S100 (see FIG. 4). The traveler also inputs, at step S102, the departure date and time, the departure point and the return destination. Then, the itinerary preparing system 10 prepares an itinerary as shown in FIG. 6 based on the flowchart of FIG. 4, while incorporating the supplementary items such as rest, lunch, dinner, or the like into the schedule.

The prepared schedule may be displayed on the route map, or may be indicated in time sequence as a time schedule, as shown in FIG. 6.

Although, in the foregoing embodiment, rests, meals and lodging have been described as examples of supplementary items, other items may be freely added as desired.

Figure 7:
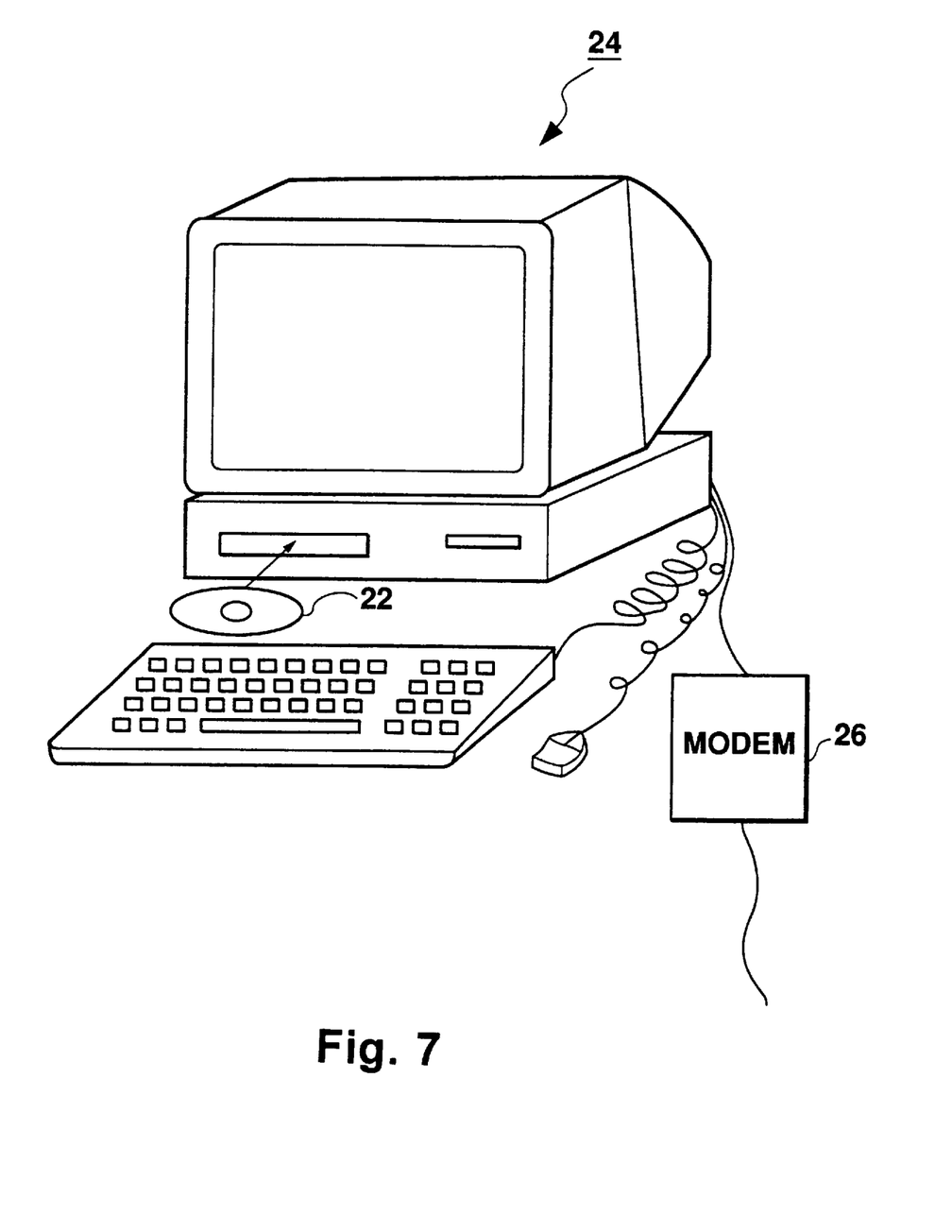
FIG. 7 is an explanatory view for showing a case where a computer is operated by using a storage device which stores a program for executing an itinerary preparing operation.

Further, the program for executing an itinerary making process (see FIG. 4) by the itinerary making system according to the embodiments may be stored in a storage device 22 shown in FIG. 7. The program stored in the storage device is then installed into a computer 24 or the like of FIG. 7, so that the itinerary making system can be established. The storage device includes, for example, a magnetic disc, magnetic tape, RAM, flash memory, optical disc, DVD, etc., as well as a CD-ROM, and a floppy disc. The storage device also includes a RAM which stores the program received from an outside service center via a communication line and is used to perform an itinerary preparing operation.

As shown in FIG. 7, the information can be obtained from the external database 14 shown in FIG. 1 by simply connecting the computer 24 to a modem 26. In the case where a CD-ROM which already stores information in the database 14 is used, the itinerary preparing operation may be executed without using the modem 26.

As described, according to the present invention, it is possible to plan a time schedule from simple information regarding desired destinations so as to simply and quickly make an itinerary for implementing a smooth tour.

While what has been described above is considered to be a preferred embodiment of the invention, it will be understood that various modifications may be made thereto, and it is intended that the appended claims cover all such modifications as falling within the true spirit and scope of the invention.

What is claimed is:

1. A computerized itinerary preparing system for preparing an itinerary based on information regarding at least one facility entered by a traveler, the system comprising:

basic stay time storage means for storing basic stay time for each of said at least one facility;

search means for searching through said basic stay time storage means for the basic stay time corresponding to said at least one facility; and schedule preparation means for planning a tour time schedule based on the searched basic stay time to prepare the itinerary.

2. A system according to claim 1 further comprising change means for changing said basic stay time.

3. A system according to claim 1 further comprising an output section for outputting the prepared itinerary.

4. A computerized itinerary preparing system for preparing an itinerary based on information regarding at least one facility entered by a traveler, the system comprising:

supplementary item storage means for storing data regarding supplementary items for smoothly implementing a tour;

item judgement means for determining whether or not said supplementary items are contained in items entered by the traveler; and schedule supplement means for inserting said supplementary items into predetermined time points of the itinerary when said supplementary items are not contained in the entered items based on a result from said judgement means to supplement said itinerary.

5. A system according to claim 4 further comprising change means for changing said supplementary items.

6. A system according to claim 4, wherein said supplementary items are rest facilities.

7. A system according to claim 6, wherein said supplementary item storage means stores said data regarding said rest facilities and the basic stay time of said rest facilities, and wherein said schedule supplement means inserts said supplementary items into the predetermined time points of the itinerary when said supplementary items are not contained in the entered items based on the result from the item judgement means and plans a time schedule based on the basic stay time of the supplementary items to supplement the itinerary.

8. A system according to claim 7, further comprising:

basic stay time storage means for storing basic stay time for each of said at least one facility;

search means for searching through the basic stay time storage means for the basic stay time corresponding to each of said at least one facility; and schedule preparation means for planning said time schedule based on the searched basic stay time and the basic stay time of the inserted supplementary items to prepare the itinerary.

9. A system according to claim 8 further comprising an output section for outputting the itinerary.

10. A system according to claim 4 further comprising an output section for outputting the itinerary.

11. A computer program storage device readable by a machine, tangibly embodying a program of instructions executable by the machine to perform method steps for making an itinerary, said method steps comprising steps of:

1) receiving information regarding facilities;

2) searching through a database which stores a basic stay time corresponding to each of the facilities for the basic stay time corresponding to each the facilities; and 3) preparing an itinerary based on the searched basic stay time.

12. A computer program storage device readable by a machine, tangibly embodying a program of instructions executable by the machine to perform method steps for making an itinerary, said method steps comprising steps of:

1) receiving information regarding facilities;

2) determining whether or not the received facility information contains supplementary items for smoothly implementing a tour; and 3) when the supplementary items are not contained in the received information as a result from the determining step, inserting the supplementary items into predetermined time points in the itinerary so as to complete the itinerary.

* * * * *